United States Patent
Klesyk

(10) Patent No.: US 9,236,813 B2
(45) Date of Patent: Jan. 12, 2016

(54) INVERTER WITH DUAL-RANGE LOAD SENSING

(71) Applicant: Lear Corporation, Southfield, MI (US)

(72) Inventor: Krzysztof Klesyk, Novi, MI (US)

(73) Assignee: Lear Corporation, Southfield, MI (US)

( * ) Notice: Subject to any disclaimer, the term of this patent is extended or adjusted under 35 U.S.C. 154(b) by 317 days.

(21) Appl. No.: 14/033,931

(22) Filed: Sep. 23, 2013

(65) Prior Publication Data

US 2015/0085543 A1  Mar. 26, 2015

(51) Int. Cl.
*H02M 7/537* (2006.01)
*H02M 7/48* (2007.01)
*B60L 1/00* (2006.01)
*H02M 1/00* (2007.01)

(52) U.S. Cl.
CPC .............. *H02M 7/48* (2013.01); *B60L 1/006* (2013.01); *B60L 2210/42* (2013.01); *B60L 2240/529* (2013.01); *B60L 2260/26* (2013.01); *H02M 2001/0009* (2013.01)

(58) Field of Classification Search
CPC .......... B60L 11/18; H02M 7/537; H02M 7/48
See application file for complete search history.

(56) References Cited

U.S. PATENT DOCUMENTS

| | | | |
|---|---|---|---|
| 6,363,906 B1 | 4/2002 | Thompson et al. | |
| 6,817,329 B2 | 11/2004 | Buglione et al. | |
| 7,389,837 B2 | 6/2008 | Tamai et al. | |
| 7,610,143 B1 | 10/2009 | Boesch | |
| 8,304,929 B2 | 11/2012 | Sweet et al. | |
| 2010/0120581 A1* | 5/2010 | Mitsutani | B60L 3/0046 477/7 |
| 2011/0270551 A1* | 11/2011 | Kagan | G01R 22/10 702/61 |
| 2012/0275196 A1* | 11/2012 | Chapman | H02M 7/4807 363/17 |

* cited by examiner

*Primary Examiner* — Jue Zhang
(74) *Attorney, Agent, or Firm* — Brooks Kushman P.C.

(57) ABSTRACT

An inverter assembly includes an inverter and a load sensor. The inverter is configured to provide electrical power to a load. The load sensor has a first amplifier for sensing current of the load when the load is a low power load connected to the inverter and a second amplifier for sensing the load current when the load is a high power load connected to the inverter. Vehicle functionality such as start/stop functionality may be disabled while the load sensor senses that the load is connected to the inverter whereas the start/stop functionality may be disabled while the load sensor senses that the load is not connected to the inverter.

10 Claims, 2 Drawing Sheets

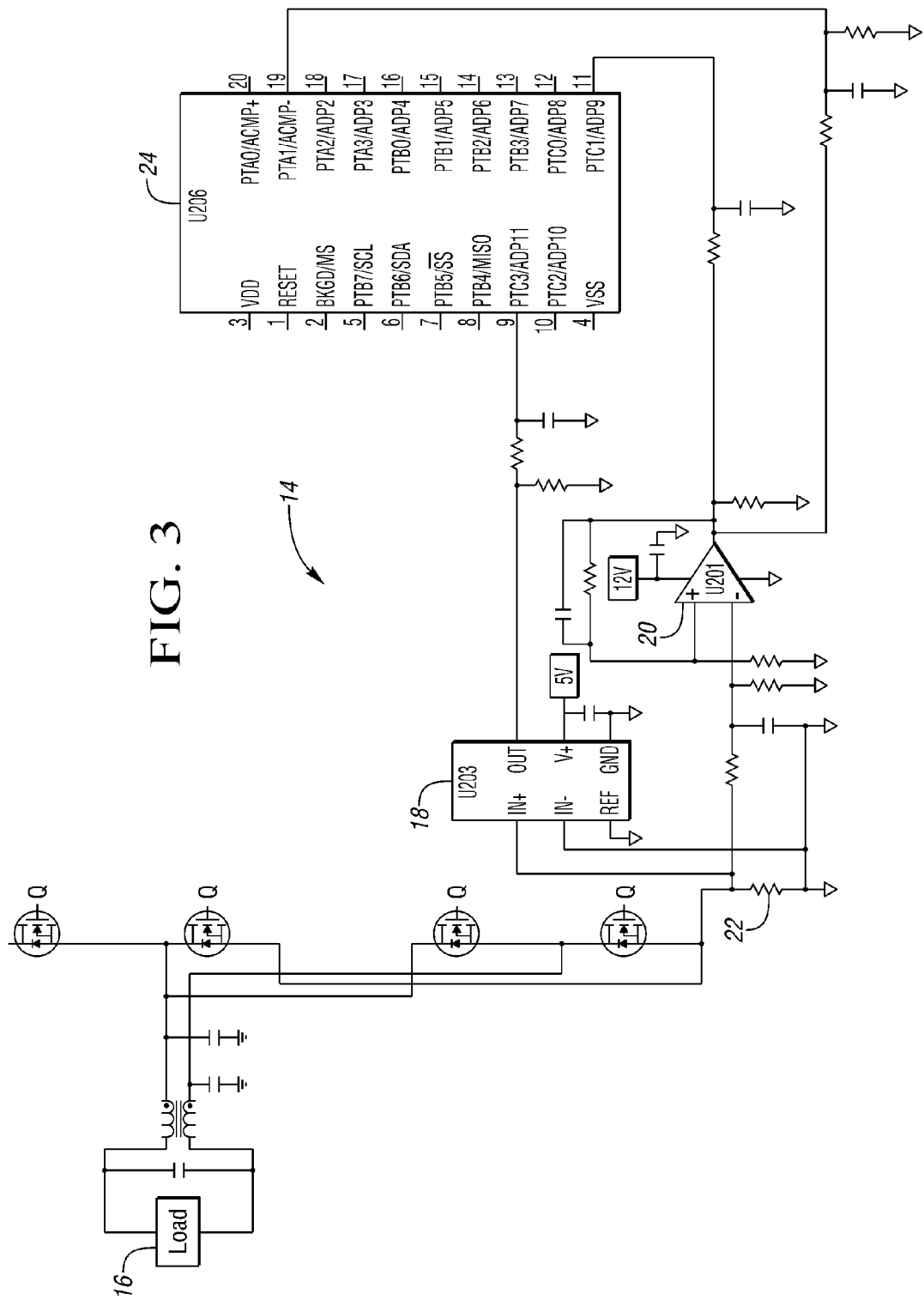

INVERTER WITH DUAL-RANGE LOAD SENSING

TECHNICAL FIELD

The present invention relates to detecting current of a load powered by an inverter of a vehicle.

BACKGROUND

A vehicle may include a DC (direct current) battery configured to supply a DC voltage and a DC to AC (alternating current) inverter configured to invert the DC voltage from the battery into an AC output voltage. The AC output voltage may be used to power electrical appliances (i.e., loads) within the vehicle such as laptops and cell phones, DVD players and game station consoles, televisions, etc., which require an AC supply voltage for their operation. For example, the battery supplies a 12V DC voltage which the inverter inverts into an AC output voltage appropriate for the load (e.g., 120V RMS at 60 Hz).

The vehicle may have start/stop functionality. A problem is that when the vehicle is auto-started, which is allowed to occur while the start/stop functionality is enabled, the DC voltage supplied by the battery can dip down. For instance, the battery supplied DC voltage can dip from 12V down to 6V-8V. In turn, the inverter rating decreases such as down to 11V. Thus, when the vehicle is auto-started, the inverter output can drop out as a result of the inverter rating decreasing in response to the battery supplied DC voltage dipping. Understandably, this can cause user annoyance as the laptop and cell phone screens may flicker and their speakers may beep, the DVD player and game station console may restart, and the television may drop out and require manual operation to restart.

Accordingly, it is desirable that the vehicle is not auto-started while a load is being supplied with electrical power from the inverter (i.e., while a load is electrically connected (or "connected") to the inverter). That is, it is desirable that the start/stop functionality be disabled while a load is being supplied with electrical power from the inverter. This is because the vehicle is not allowed to auto-start while the start/stop functionality is disabled.

In some implementations, the inverter is part of an assembly having a load sensor configured to sense the electrical current of the load (i.e., the load current). Such current sensing is used for protection (i.e., overcurrent). On the other hand, a load consuming power such as below 10% of the power ratio of the inverter is not detected by the load sensor as the corresponding current is relatively very low. Thus, the condition may occur in which a light power load connected to the inverter is not detected and it is therefore presumed that no load is connected to the inverter. Consequently, as it is presumed that no load is connected to the inverter, the start/stop functionality is not disabled and the vehicle is therefore allowed to be auto-started. As described, the operation of the load, which is in fact connected to the inverter, is compromised when the vehicle is auto-started.

In sum, the inability of detecting a light power load connected to the inverter prevents the assembly from requesting the start/stop functionality from being disabled. On the other hand, when a heavier power load is connected to the inverter the corresponding heavier current is detectable by the load sensor of the assembly. In this case, the assembly is aware of the presence of the heavier power load connected to the inverter and based on this awareness can request the start/stop functionality to be disabled.

In one configuration in which the inverter is part of an assembly having a load sensor configured to sense load current, the load sensor includes an amplifier and an analog-to-digital converter (ADC). The amplifier amplifies a voltage corresponding to the load current (for instance, the voltage tapped across a resistor in series with the load) and the ADC converts the corresponding amplified voltage to a digital output corresponding to the load current. For example, the amplifier has a gain of ten and the resistor is a 50 mOhm resistor; the full ADC sensing range is 0 A to 10 A; the overcurrent sensing range is up to 20 A (utilizing comparator and resistor divider for scaling signal down); and the 20 A range is required for over-current protection. In this exemplary configuration, with this range standard a cell phone load consuming about 4 W of power would produce only 17 mV or 3 counts on the ADC input. As such, this cell phone load would not be detected. As a result, the start/stop functionality would not be disabled even though a load (i.e., the cell phone load) is being supplied with electrical power by the inverter. Consequently, the vehicle is allowed to auto-start which would cause the operation of the cell phone load to be disrupted.

One solution to the problem caused by the battery supplied DC voltage dipping down when the vehicle is auto-started is to operate the inverter down to 6V. However, this presents significant concerns as explained as follows. First, inverter operation at 11V providing 350 W of power and operating at 90% efficiency consumes about 35 A of current, which is seen as a limit for typical vehicle wiring applications. Inverter operation at 6V providing 350 W of power and operating at 90% efficiency consumes 65 A of current and inverter operation at 6V providing a peak requirement of 800 W of power and operating at 85% efficiency consumes 156 A of current, which are both far over the limit. As such, inverter operation down to 6V in response to the battery supplied DC voltage dipping down is not feasible.

SUMMARY

An object of the present invention is an inverter with multiple-range load sensing.

Another object of the present invention is an inverter with dual-range load sensing.

A further object of the present invention is an assembly having an inverter and a load sensor in which the load sensor has a low-range amplifier for sensing the current of a load connected to the inverter when the load is a light power load and a high-range amplifier for sensing the current of the load when the load is a heavy power load.

Another object of the present invention is an assembly having an inverter and a load sensor in which the load sensor has a low-range amplifier used for sensing current of a load connected to the inverter and a high-range amplifier used for sensing current of the load when the low-range amplifier reaches its maximum output power and for providing over-current protection.

In carrying out at least one of the above and other objects, the present invention provides an assembly having an inverter and a load sensor. The inverter is configured to provide electrical power to a load. The load sensor has a low-range amplifier for sensing current of the load when a voltage corresponding to the load current falls within a low range and a high-range amplifier for sensing the load current when the voltage corresponding to the load current falls within a high-range.

Further, in carrying out at least one of the above and other objects, the present invention provides an assembly including an inverter and a load sensor. The inverter is configured to provide electrical power to a load. The load sensor has a first amplifier for sensing current of the load when the load is a low power load connected to the inverter and a second amplifier for sensing the load current when the load is a high power load connected to the inverter.

BRIEF DESCRIPTION OF THE DRAWINGS

FIG. 3 illustrates a highly-detailed schematic diagram of a load sensor configured to provide dual-range load sensing for an inverter in accordance with an embodiment of the present invention.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
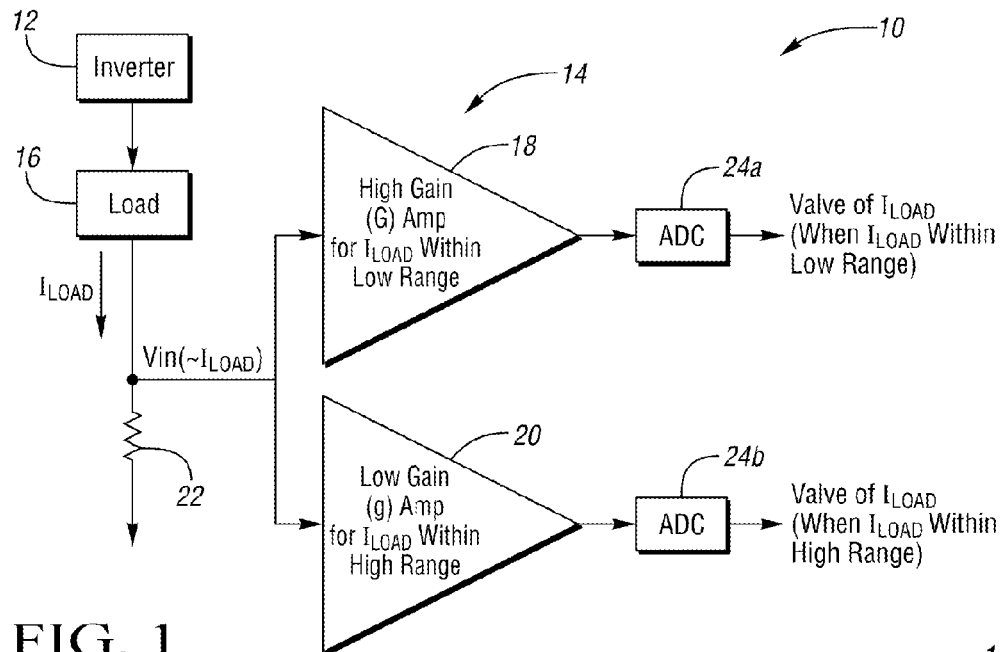
FIG. 1 illustrates a block diagram of an assembly having an inverter and a load sensor configured to provide dual-range load sensing in accordance with an embodiment of the present invention.

Referring now to FIG. 1, a block diagram of an assembly 10 having an inverter 12 and a load sensor 14 configured to provide dual-range load sensing in accordance with an embodiment of the present invention is shown. Inverter 12 is a DC (direct current) to AC (alternating current) inverter configured to invert a DC input voltage into an AC output voltage. For instance, inverter 12 is part of a vehicle and is supplied with a DC input voltage from a DC battery of the vehicle. Inverter 12 supplies the AC output voltage to a load 16 (load 16 being one load or multiple loads) electrically connected (or "connected") to inverter 12. Load 16 is one or more electrical appliances within the vehicle such as a laptop, a cell phone, a DVD player, a game station console, a television, etc. which require an AC supply voltage for operation.

A load current $I_{LOAD}$ flows through load 16 when load 16 is operating. The current $I_{LOAD}$ is based on the amount of power consumed by load 16 using the AC output voltage from inverter 12. For a given AC output voltage from inverter 12, the current $I_{LOAD}$ is large when the amount of power consumed by load 16 is large and is small when the amount of power consumed by load 16 is small. As such, the current $I_{LOAD}$ is non-existent when load 16 is not being supplied with the AC output voltage from inverter 12 (i.e., when load 16 is not electrically connected to inverter 12).

Load sensor 14 is configured to detect the amount of current $I_{LOAD}$. From the amount of current $I_{LOAD}$ it can be detected whether or not load 16 is being supplied with electrical power from inverter 12 (i.e., whether load 16 is connected to inverter 12). Again, the current $I_{LOAD}$ is non-existent when load 16 is not connected to inverter 12. That is, the current $I_{LOAD}$ is absent when load 16 is not connected to inverter 12 (i.e., when load 16 is absent from being connected to inverter 12) and the current $I_{LOAD}$ is present when load 16 is connected to inverter 12 (i.e., when load 16 is present in being connected to inverter 12).

The vehicle for use with assembly 10 may have start/stop functionality. In this case, the vehicle is allowed to auto-start while the start/stop functionality is enabled, but is not allowed to auto-start while the start/stop functionality is disabled. Operation of load 16 may likely be negatively affected when the vehicle is auto-started while load 16 is present in being connected to inverter 12. Thus, the start/stop functionality should be disabled whenever load 16 is present. As such, the start/stop functionality should be disabled while the presence of the current $I_{LOAD}$ is detected.

Load sensor 14 provides dual-range load sensing for sensing the current $I_{LOAD}$. The dual-range load sensing is provided as load sensor 14 includes a low-range amplifier 18 and a high-range amplifier 20. Amplifiers 18 and 20 are configured to receive an input voltage $V_{in}$ corresponding to the current $I_{LOAD}$ (e.g., the input voltage $V_{in}$ is proportional to the current $I_{LOAD}$). The input voltage $V_{in}$ is tapped across a resistor 22 in series with load 16.

Low-range amplifier 18 is configured to amplify the input voltage $V_{in}$ and thereby generate an amplified output voltage when the input voltage $V_{in}$ falls within a low range. That is, amplifier 18 is configured to generate an amplified output voltage based on the input voltage $V_{in}$ when the following condition exists: a minimum threshold voltage<the input voltage $V_{in}$<an intermediate threshold voltage. For instance, in terms of the current $I_{LOAD}$, in one implementation, amplifier 18 is configured to generate an amplified output voltage from the input voltage $V_{in}$ when the condition 20 mA<the current $I_{LOAD}$<1.0 A exists.

Conversely, high-range amplifier 20 is configured to amplify the input voltage $V_{in}$ and thereby generate an amplified output voltage when the input voltage $V_{in}$ falls within a high range. That is, amplifier 20 is configured to generate an amplified output voltage based on the input voltage $V_{in}$ when the following condition exists: the intermediate threshold voltage<the input voltage $V_{in}$<a maximum threshold voltage. For instance, in terms of the current $I_{LOAD}$, in the one implementation, amplifier 20 is configured to generate an amplified output voltage from the input voltage $V_{in}$ when the condition 1 A<the current $I_{LOAD}$<22 A exists.

As such, low-range amplifier 18 is configured to sense the current $I_{LOAD}$ when load 16 connected to inverter 12 is a light power load and high-range amplifier 20 is configured to sense the current $I_{LOAD}$ when the load is a heavy power load. Put another way, low-range amplifier 18 is utilized for sensing the current $I_{LOAD}$ of load 16 connected to inverter 12 and high-range amplifier 20 is utilized for sensing current of the load when low-range amplifier 18 reaches its maximum output power and for providing over-current protection.

As described, low-range amplifier 18 is for accurate detection of light power AC loads as amplifier 18 is operable when the load current $I_{LOAD}$ falls within a range of 20 mA to 1.0 A for example. As amplifier 18 is for relatively low values of the load current $I_{LOAD}$, amplifier 18 therefore amplifies the input voltage $V_{in}$ corresponding to the load current $I_{LOAD}$ with a relatively large gain "G". In one implementation, the gain G is 100. With the gain G of 100, a standard cell phone load consuming about 4 W of power produces 174 mV or 36 counts on an ADC input as opposed to only 17 mV or 3 counts on the ADC input with a gain 10 as described above in the context of an exemplary configuration. Thus, range amplifier 18 is a low-range, high-gain amplifier.

Conversely, high-range amplifier 20 is for heavier power AC loads and over-current protection as amplifier 20 is operable when the current $I_{LOAD}$ falls within a range of 1 A to 22 A for example. As amplifier 20 is for relatively high values of the load current $I_{LOAD}$, amplifier 20 amplifies the input voltage $V_{in}$ corresponding to the load current $I_{LOAD}$ with a relatively small gain "g". In the one implementation with the gain G being 100, the gain g is six. Thus, amplifier 22 is a high-range, low gain amplifier.

Load sensor 14 further includes an ADC (analog-to-digital converter) 24a associated with low-range amplifier 18 and an ADC 24b associated with high-range amplifier 20. ADC 24a receives the (analog) amplified output voltage $V_{out}$ ($V_{out}=G*V_{in}$) from amplifier 18 and converts it into a corresponding digital value. ADC 24a is tuned to take the gain G into consideration such that the corresponding digital value accurately reflects the input voltage $V_{in}$ and thereby reflects the current $I_{LOAD}$. Again, amplifier 18 provides amplified output voltage $V_{out}$ to ADC 24a when the input voltage $V_{in}$ and thereby the current $I_{LOAD}$ fall within a low range.

Similarly, ADC 24b receives the (analog) amplified output voltage $V_{out}$($V_{out}=g*V_{in}$) from high-range amplifier 20 and converts it into a corresponding digital value. ADC 24b is tuned to take the gain g into consideration such that the corresponding digital value accurately reflects the input voltage $V_{in}$ and thereby reflects the current $I_{LOAD}$. Again, amplifier 20 provides amplified output voltage $V_{out}$ to ADC 24b when the input voltage $V_{in}$ and thereby the current $I_{LOAD}$ fall within a high range.

Figure 2:
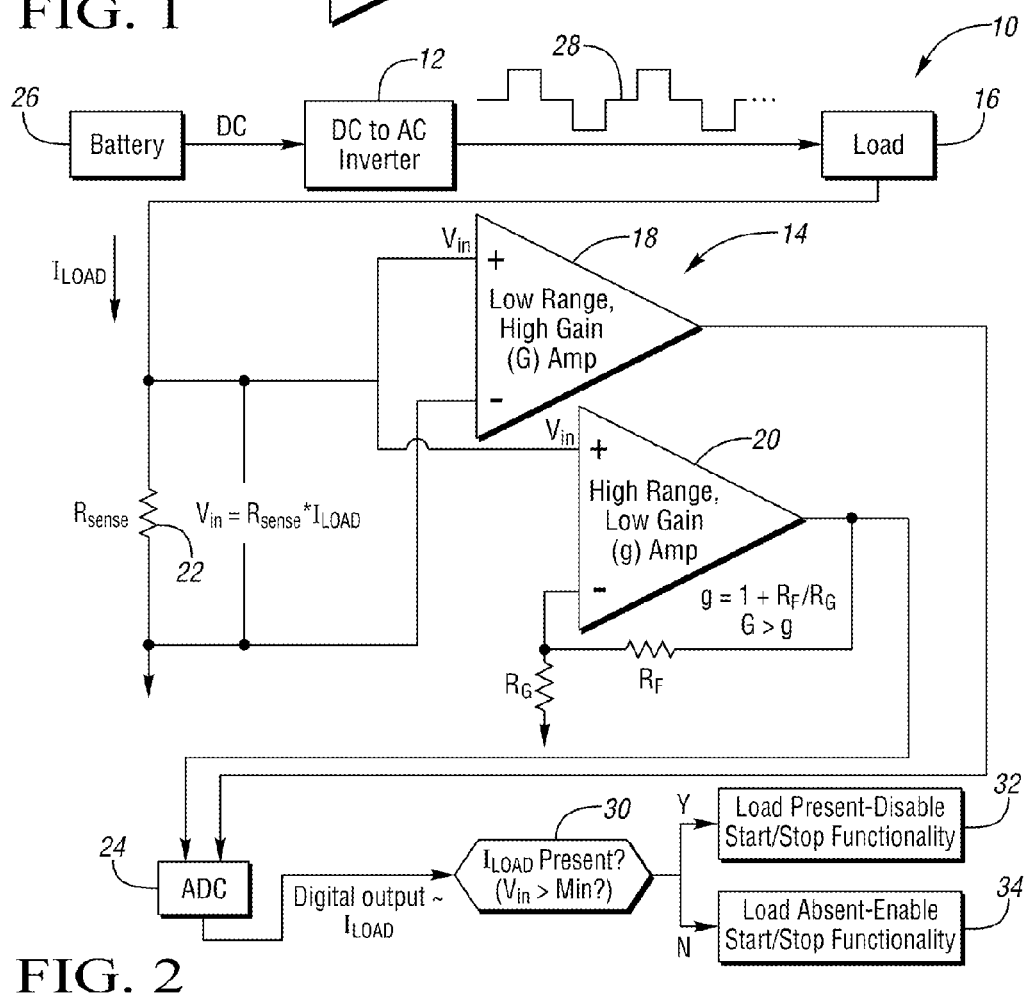
FIG. 2 illustrates a block diagram in further detail of an assembly having an inverter and a load sensor configured to provide dual-range load sensing in accordance with an embodiment of the present invention.

Referring now to FIG. 2, with continual reference to FIG. 1, a block diagram in further detail of assembly 10 having inverter 12 and load sensor 14 in accordance with an embodiment of the present invention is shown. As shown in FIG. 2, inverter 12 inverts a DC input voltage from a DC battery 26 into an AC output voltage 28 for use by load 16. AC output voltage 28 has the form of a modified sine wave as shown in FIG. 2. As further shown in FIG. 2, in this embodiment, low-range amplifier 18 is a differential amplifier and high-range amplifier 20 is a non-inverting amplifier.

With reference to block 30 of FIG. 2, the digital output indicative of the current $I_{LOAD}$ outputted by ADC 24 is analyzed to confirm whether or not a load 16 is in fact electrically connected to inverter 12. As noted above, the current $I_{LOAD}$ is non-existent when load 16 is not connected to inverter (i.e., when load 16 is absent). As further noted above, low-range amplifier 18 is operable to amplify a voltage input $V_{in}$ corresponding to a current $I_{LOAD}$ of at least 20 mA.

Accordingly, when the digital output from ADC 24 is indicative of the current $I_{LOAD}$ being at least 20 mA, load sensor 14 determines that a load 16 is electrically connected to inverter 12 (i.e., load 16 is present). In this case, load sensor 14 advises the vehicle controller or the like to disable the start/stop functionality as shown in block 32. This is because it is desirable that the vehicle not be auto-started while a load is being supplied with electrical power from inverter 12 as explained above. It is to be appreciated that as in this example load sensor 14 can detect a current $I_{LOAD}$ as low as 20 mA with the use of low-range amplifier 18, while also being able to detect a current $I_{LOAD}$ of 22 A, the condition in which a light power load is connected to inverter 12 will be detected whereas without the dual-range load sensing provided by load sensor 14 such light power load connected to inverter 12 might not have been detected. Thus, with the use of load sensor 14, false positives indicative of a load being absent from inverter 12 will be avoided and the start/stop functionality will be properly disabled, due to a load being in fact present, as opposed to being improperly not disabled.

Conversely, when the digital output from ADC 24 is indicative of the current $I_{LOAD}$ being less than 20 mA, load sensor 14 determines that a load 16 is not electrically connected to inverter 12 (i.e., load 16 is absent). In this case, load sensor 14 advises the vehicle controller or the like to not disable the start/stop functionality as shown in block 34. This is because auto-starting of the vehicle will not disrupt the load operation as inverter 12 is not supplying electrical power to any load.

Referring now to FIG. 3, with continual reference to FIGS. 1 and 2, a highly-detailed schematic diagram of load sensor 14 configured to provide dual-range load sensing for inverter 12 in accordance with an embodiment of the present invention is shown.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. An assembly comprising:
   an inverter configured to provide electrical power to a load;
   a load sensor having a resistor in series with the load to sense across the resistor a voltage corresponding to a load current of the load;
   the load sensor further having a low-range amplifier for sensing the load current when the voltage corresponding to the load current falls within a low range between a minimum positive threshold value and an intermediate threshold value and a high-range amplifier for sensing the load current when the voltage corresponding to the load current falls within a high-range between the intermediate threshold value and a maximum threshold value;
   wherein when the voltage falls within the low range the low-range amplifier amplifies the voltage with a high gain to generate an amplified output, when the voltage falls within the high range the high-range amplifier amplifies the voltage with a low gain to generate an amplified output, and when the voltage is less than the minimum positive threshold value neither amplifier generates an amplified output;
   an analog-to-digital converter (ADC) configured to generate a digital output, the digital output being based on an amplified output from one of the amplifiers when the one of the amplifiers generates the amplified output and the digital output not being based on an amplified output from one of the amplifiers when neither amplifier generates an amplified output; and
   a controller configured to determine whether the load is receiving electrical power from the inverter based on the digital output of the ADC, wherein the controller determines that the load is receiving electrical power from the inverter when the digital output of the ADC is based on an amplified output from one of the amplifiers and determines that the load is not receiving electrical power from the inverter when the digital output of the ADC is not based on an amplified output from one of the amplifiers.

2. The assembly of claim 1 wherein:
   the inverter, the load sensor, the ADC, and the controller are part of a vehicle, the vehicle having start/stop vehicle functionality in which when the start/stop vehicle functionality is enabled an engine of the vehicle is allowed to be automatically shut down and restarted for reducing engine idling and when the start/stop vehicle functionality is disabled the engine is not allowed to be automatically shut down and restarted; and the controller is further configured to disable the start/stop vehicle functionality while the load is receiving electrical power from the inverter.

3. The assembly of claim 2 wherein:
the controller is further configured to enable the start/stop vehicle functionality while the load is not receiving electrical power from the inverter.

4. The assembly of claim 1 wherein:
the low-range amplifier is a differential amplifier and the high-range amplifier is a non-inverting amplifier.

5. The assembly of claim 1 wherein:
the electrical power provided by the inverter is an AC electrical power.

6. The assembly of claim 5 wherein:
the inverter is a DC/AC inverter.

7. An assembly comprising:
an inverter configured to provide electrical power to a load;
a load sensor having a resistor in series with the load to sense across the resistor a voltage corresponding to a load current of the load;
the load sensor further having a first amplifier for sensing the load current when the load is a low power load connected to the inverter and a second amplifier for sensing the load current when the load is a high power load connected to the inverter, wherein the load is a low power load when the voltage corresponding to the load current falls between a minimum positive threshold value and an intermediate threshold value and the load is a high power load when the voltage corresponding to the load current falls between the intermediate threshold value and a maximum threshold value;
wherein when the load is a low power load the first amplifier amplifies the voltage with a high gain to generate an amplified output, when the load is a high power load the second amplifier amplifies the voltage with a low gain to generate an amplified output, and otherwise neither amplifier generates an amplified output;
an analog-to-digital converter (ADC) configured to generate a digital output, the digital output being based on an amplified output from one of the amplifiers when the one of the amplifiers generates the amplified output and the digital output not being based on an amplified output from one of the amplifiers when neither amplifier generates an amplified output; and
a controller configured to determine whether the load is receiving electrical power from the inverter based on the digital output of the ADC, wherein the controller determines that the load is receiving electrical power from the inverter when the digital output of the ADC is based on an amplified output from one of the amplifiers and determines that the load is not receiving electrical power from the inverter when the digital output of the ADC is not based on an amplified output from one of the amplifiers.

8. The assembly of claim 7 wherein:
the inverter, the load sensor, the ADC, and the controller are part of a vehicle, the vehicle having start/stop vehicle functionality in which when the start/stop vehicle functionality is enabled an engine of the vehicle is allowed to be automatically shut down and restarted for reducing engine idling and when the start/stop vehicle functionality is disabled the engine is not allowed to be automatically shut down and restarted; and
the controller is further configured to disable the start/stop vehicle functionality while the load is receiving electrical power from the inverter.

9. The assembly of claim 8 wherein:
the controller is further configured to enable the start/stop vehicle functionality while the load is not receiving electrical power from the inverter.

10. The assembly of claim 7 wherein:
the first amplifier is a differential amplifier and the second amplifier is a non-inverting amplifier.

* * * * *